(12) United States Patent
Kim et al.

(10) Patent No.: US 9,679,697 B2
(45) Date of Patent: Jun. 13, 2017

(54) METHOD FOR MANUFACTURING MULTILAYER CERAMIC CONDENSER

(71) Applicant: SAMSUNG ELECTRO-MECHANICS CO., LTD., Suwon-Si, Gyeonggi-Do (KR)

(72) Inventors: Hyung Joon Kim, Gyunggi-Do (KR); Jong Hoon Kim, Gyunggi-Do (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 53 days.

(21) Appl. No.: 14/334,615

(22) Filed: Jul. 17, 2014

(65) Prior Publication Data

US 2014/0317897 A1 Oct. 30, 2014

Related U.S. Application Data

(62) Division of application No. 13/191,890, filed on Jul. 27, 2011, now Pat. No. 8,804,305.

(30) Foreign Application Priority Data

Dec. 8, 2010 (KR) .................. 10-2010-0125069

(51) Int. Cl.
*H01G 4/12* (2006.01)
*H01G 4/012* (2006.01)
(Continued)

(52) U.S. Cl.
CPC ........... *H01G 4/1227* (2013.01); *H01G 4/008* (2013.01); *H01G 4/012* (2013.01); *H01G 4/232* (2013.01);
(Continued)

(58) Field of Classification Search
CPC .... H01G 4/232; H01G 4/2325; H01C 17/281; H01C 17/283; Y10T 29/435
See application file for complete search history.

(56) References Cited

U.S. PATENT DOCUMENTS 3,612,963 A * 10/1971 Piper .................... H01G 4/2325
                                                    29/25.42
4,771,520 A    9/1988 Tanaka et al.
(Continued)

FOREIGN PATENT DOCUMENTS

JP   62-226613 A   10/1987
JP   06-077086 A    3/1994
(Continued)

OTHER PUBLICATIONS

Chinese Office Action issued in corresponding Chinese Application No. 201110252683.6, dated Nov. 2, 2014, with English translation.
(Continued)

*Primary Examiner* — Livius R Cazan
(74) *Attorney, Agent, or Firm* — McDermott Will & Emery LLP

(57) ABSTRACT

Disclosed are a multilayer ceramic condenser and a method for manufacturing the same. There is provided a multilayer ceramic condenser including: a multilayer main body in which a plurality of dielectric layers including a first side, a second side, a third side, and a fourth side are stacked; a first cover layer and a second cover layer forming the plurality of dielectric layers; a first dielectric layer disposed between the first cover layer and the second cover layer and printed with a first inner electrode pattern drawn to the first side; a second dielectric layer alternately stacked with the first dielectric layer and printed with a second inner electrode pattern
(Continued)

drawn to the third side; and a first side portion and a second side portion each formed on the second side and the fourth side opposite to each other.

10 Claims, 5 Drawing Sheets

(51) Int. Cl.
   *H01G 4/008* (2006.01)
   *H01G 4/30* (2006.01)
   *H01G 4/232* (2006.01)
(52) U.S. Cl.
   CPC ............ *H01G 4/2325* (2013.01); *H01G 4/30* (2013.01); *Y10T 29/435* (2015.01)

(56) References Cited

U.S. PATENT DOCUMENTS

| | | | |
|---|---|---|---|
| 5,715,186 A | 2/1998 | Curtet | |
| 7,664,480 B2 | 2/2010 | Kim et al. | |
| 2002/0036882 A1* | 3/2002 | Kishi .................. | H01G 4/1227 361/306.3 |
| 2003/0006488 A1 | 1/2003 | Wakabayashi et al. | |
| 2005/0094351 A1 | 5/2005 | Kobayashi | |
| 2005/0099835 A1* | 5/2005 | Swenson .............. | H01C 17/006 365/63 |
| 2006/0139848 A1 | 6/2006 | Kim et al. | |
| 2008/0304204 A1 | 12/2008 | Suzuki | |
| 2010/0025075 A1 | 2/2010 | Feichtinger et al. | |

FOREIGN PATENT DOCUMENTS

| | | | |
|---|---|---|---|
| JP | 08-050545 A | 2/1996 | |
| JP | 10-065329 A | 3/1998 | |
| JP | 2001-293423 A | 10/2001 | |
| JP | 2003-017645 A | 1/2003 | |
| JP | 2004-158541 A | 6/2004 | |
| JP | 03-108306 U | 4/2005 | |
| JP | 2005-259772 A | 9/2005 | |
| JP | 2005-303160 A | 10/2005 | |
| JP | 2006-128282 A | 5/2006 | |
| JP | 2006-179873 A | 7/2006 | |
| JP | 2007-173714 A | 7/2007 | |
| JP | 2009-032833 A | 2/2009 | |
| JP | 2010-050263 A | 3/2010 | |
| JP | 2010-093038 A | 4/2010 | |
| JP | 2010-518651 A | 5/2010 | |
| JP | 05-175073 B2 | 4/2013 | |
| KR | 10-2006-0026933 A | 3/2006 | |

OTHER PUBLICATIONS

Japanese Office Action for Patent Application No. 2011-165278 dated Mar. 12, 2013.
Japanese Office Action with English translation issued in Japanese Application No. 2013-013298 issued Sep. 24, 2013.
Chinese Office Action issued in Chinese Application No. 201110252683.6 dated Feb. 24, 2014, w/English translation.
Japanese Trial Decision issued in corresponding Japanese Application No. 2011-165278, dated Apr. 1, 2014, with English translation.
Japanese Office Action issued in JP 2011-165278, issued Oct. 16, 2012.
Korean Office Action, with English Translation, issued in Korean Patent Application No. 10-2010-0125069, dated Jan. 3, 2012.
U.S. Non-Final Office Action issued in U.S. Appl. No. 13/191,890 dated Dec. 12, 2012.
U.S. Final Office Action issued in U.S. Appl. No. 13/191,890 dated Apr. 18, 2013.
U.S. Non-Final Office Action issued in U.S. Appl. No. 13/191,890 dated Jul. 31, 2013.
U.S. Notice of Allowance issued in U.S. Appl. No. 13/191,890 dated Apr. 4, 2014.

* cited by examiner

METHOD FOR MANUFACTURING MULTILAYER CERAMIC CONDENSER

CROSS-REFERENCE TO RELATED APPLICATION

This application is a Divisional of U.S. patent application Ser. No. 13/191,890, filed on Jul. 27, 2011, now U.S. Pat. No. 8,804,305, which claims the priority of Korean Patent Application No. 10-2010-0125069 filed on Dec. 8, 2010, the disclosures of which are incorporated herein by reference.

BACKGROUND OF THE INVENTION

Field of the Invention

The present invention relates to a multilayer ceramic condensor and a method for manufacturing the same, and more particularly, to a method for manufacturing a multilayer ceramic condenser having improved reliability by securing the durability of a chip, and a multilayer ceramic condenser manufactured by the same.

Description of the Related Art

A condenser, a device capable of storing electricity, basically stores electricity in electrodes thereof by applying opposite voltages to opposing electrodes. When DC voltage is applied thereto, current flows into a condenser, while electricity is stored therein, yet when the storage of electricity is completed, current does not flow in the condenser. Meanwhile, when AC voltage is applied to the electrodes of a condenser, AC current continuously flows in the condenser while the polarity of the electrode is alternated.

The condenser may be classified as an aluminum electrolytic condenser, in which electrodes are made of aluminum and a thin oxide layer is provided between the aluminum electrodes, a tantalum condenser, using tantalum as an electrode material, a ceramic condenser, using a high-K dielectric such as barium titanate between electrodes, a multilayer ceramic condenser (MLCC), using a multilayer structure having high-K ceramic as a dielectric provided between electrodes, a film condenser using a polystyrene film as a dielectric between electrodes, or the like, according to a type of an insulator provided between electrodes.

Among others, the multilayer ceramic condenser can be implemented to have a small size while having excellent temperature and frequency characteristics, such that it has been frequently used for various applications such as a high frequency circuit, and the like.

In the multilayer ceramic condenser according to the related art, a laminate may be formed by stacking a plurality of dielectric sheets, outer electrodes having different polarities may be formed on the outside ends of the laminate, and inner electrodes alternately stacked in the laminate may be electrically connected to each of the outer electrodes.

Recently, as electronic products have become small and highly integrated, research into miniaturizing and highly integrating the multilayer ceramic condenser has been frequently conducted. In particular, various attempts to improve the connection between the inner electrodes while thinning and increasing the stacking amount of the dielectric layers in order to implement a high-capacity and small-sized multilayer ceramic condenser have been conducted.

In particular, the side portion of the dielectric layer, manufactured by various methods, is provided to secure the durability of the chips, In particular, an edge portion of the chip is the most important portion in order to prevent the occurrence of cracking in the chips and to secure the reliability thereof.

SUMMARY OF THE INVENTION

An aspect of the present invention provides a multilayer ceramic condenser capable of securing a thin dielectric layer in order to implement a highly stacked and small-sized multilayer ceramic condenser and preventing a thickness of an edge portion from being excessively thick at an unwanted portion while securing the thickness of the edge portion, and a method for manufacturing the same.

According to an aspect of the present invention, there is provided a multilayer ceramic condenser, including: a multilayer main body in which a plurality of dielectric layers including a firs side, a second side, a third side, and a fourth side are stacked; a first cover layer and a second cover layer forming the plurality of dielectric layers; a first dielectric layer disposed between the first cover layer and the second cover layer and printed with a first inner electrode pattern drawn to the first side; a second dielectric layer alternately stacked with the first dielectric layer and printed with a second inner electrode pattern drawn to the third side; and a first side portion and a second side portion each formed on the second side and the fourth side opposite to each other.

The first side portion or the second side portion may be formed by applying slurry thereto.

The maximum thickness of the first side portion or the second portion may be set to be 10 μm to 30 μm.

The maximum thickness of the first side portion or the second portion may be set to be 10 μm to 20 μm.

The thickness of an edge portion contacting corners of the multilayer main body at the first side portion or the second side portion may be 2 μm or more.

The thickness of the first cover layer or the second cover may be 10 μm or less.

The multilayer ceramic condenser may further include a first outer electrode and a second outer electrode each formed on the first side and the third side.

According to another exemplary embodiment of the present invention, there is provided a method for manufacturing a multilayer ceramic condenser, including: preparing a multilayer main body including a first cover layer and a second cover layer, a plurality of first dielectric layers formed between the first cover layer and the second cover layer and printed with first inner electrode patterns, a plurality of second dielectric layers alternately stacked with the plurality of first dielectric layers and printed with second inner electrode patterns, and a first side, a second side, a third side, and a fourth side; attaching a first film and a second film to the first cover layer and the second cover layer of the multilayer main body; forming a first side portion and a second side portion on the second side and the fourth side, respectively, by dipping the multilayer main body attached with the first film and the second film in slurry; and removing the first film and the second film attached to the multilayer main body.

The first film or the second film may be an adhesive film.

The first film or the second film may be an ultraviolet (UV) adhesive film.

The thickness of the first side portion and the second side portion may be controlled by adjusting the number of dipping.

The dipping of the multilayer main body may be performed before the first side and the third side are cut off.

The maximum thickness of the first side portion or the second portion may be set to be 10 µm to 30 µm.

The maximum thickness of the first side portion or the second portion may be set to be 10 µm to 20 µm.

The thickness of the edge portion contacting corners of the multilayer main body at the first side portion or the second side portion may be set to be 2 µm or more.

The thickness of the first cover layer or the second cover may be set to be 10 µm or less.

The method for manufacturing a multilayer ceramic condenser may further include forming a first outer electrode and a second outer electrode on the first side and the third side, respectively.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
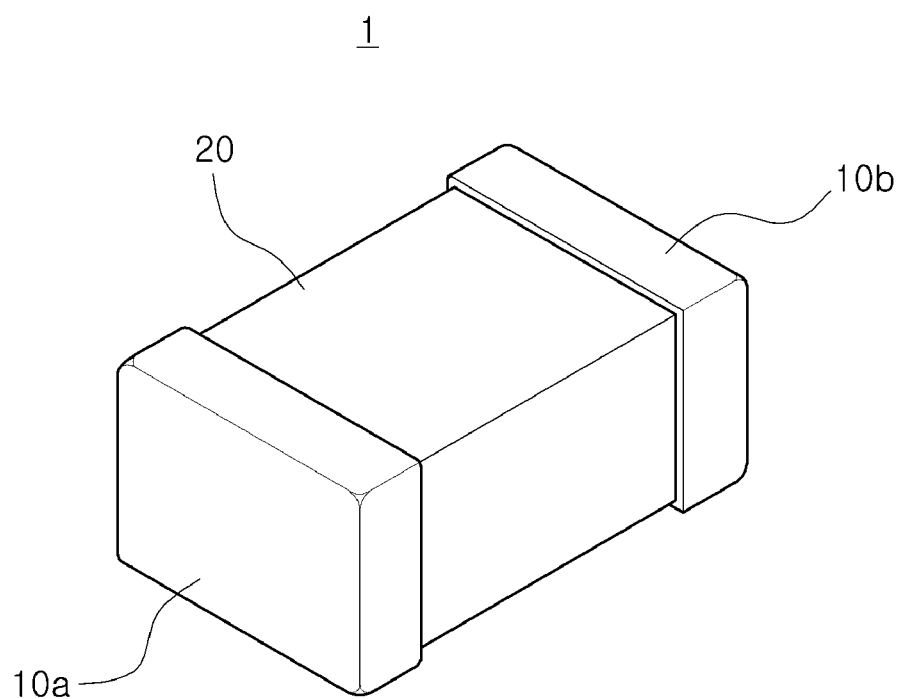
FIG. 1 is a perspective view of a multilayer ceramic condenser according to an exemplary embodiment of the present invention.

Exemplary embodiments of the present invention will be described with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity.

Further, throughout the drawings, the same or similar reference numerals will be used to designate the same components or like components having the same functions in the scope of the similar idea.

In addition, unless explicitly described to the contrary, the word "comprise" and variations such as "comprises" or "comprising," as well as the word "include" and variations such as "includes" and "including," will be understood to imply the inclusion of stated elements but not the exclusion of any other elements.

Hereinafter, a multilayer ceramic condenser and a method for manufacturing the same according to an exemplary embodiment of the present invention will be described with reference to FIGS. 1 to 6.

Figure 2:
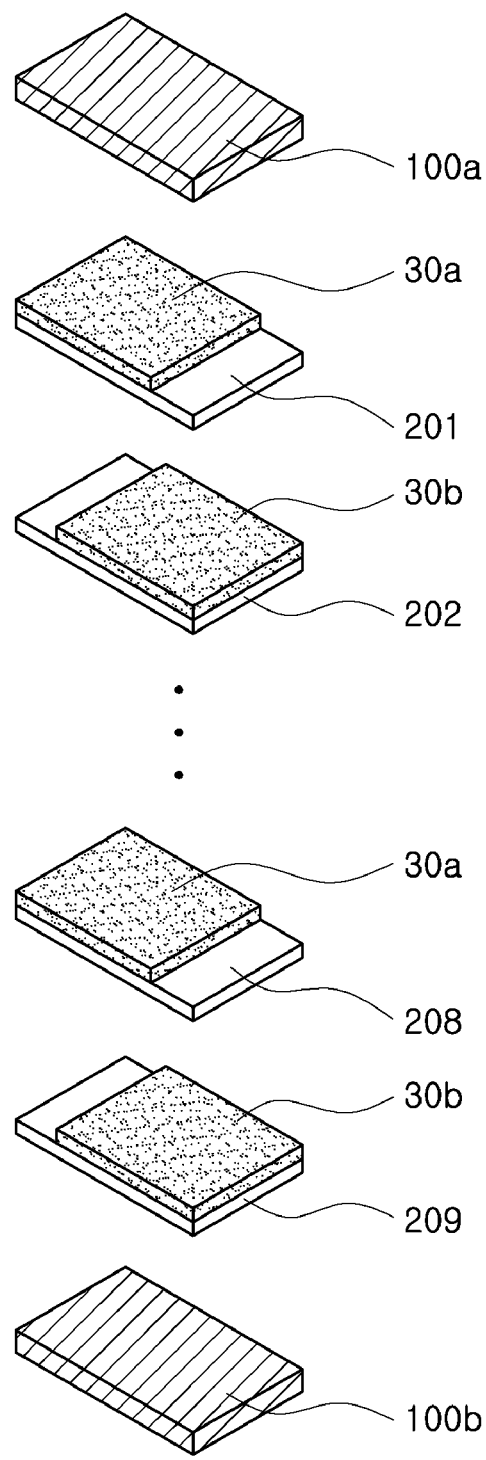
FIG. 2 is an exploded perspective view of a multilayer ceramic condenser according to an exemplary embodiment of the present invention.
Figure 3:
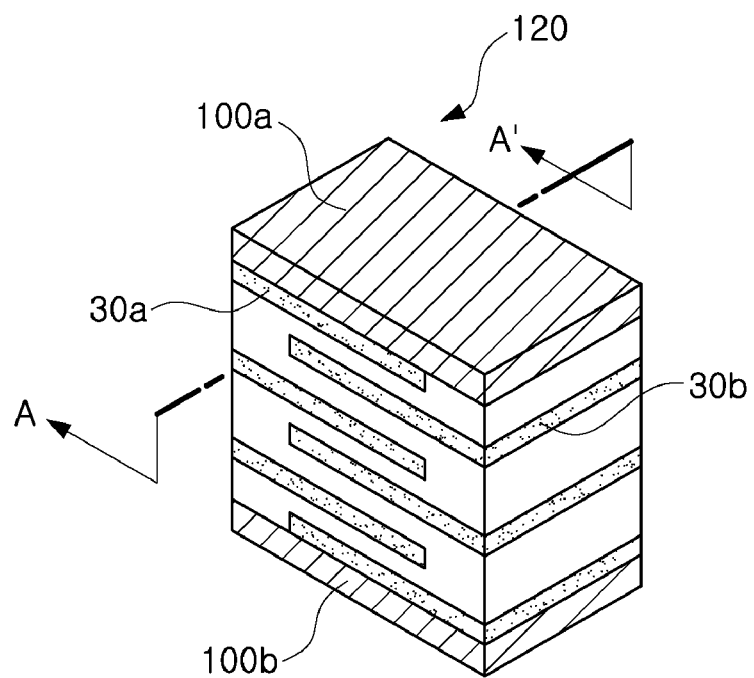
FIG. 3 is a perspective view showing a multilayer main body of a multilayer ceramic condenser according to an exemplary embodiment of the present invention.
Figure 4:
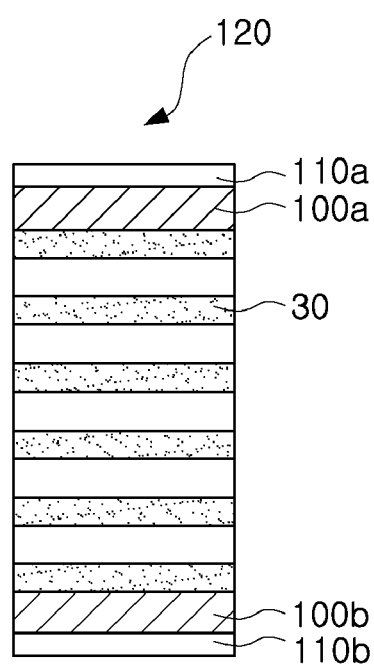
FIG. 4 is a cross-sectional view taken along line A-A' of the multilayer main body.
Figure 5:
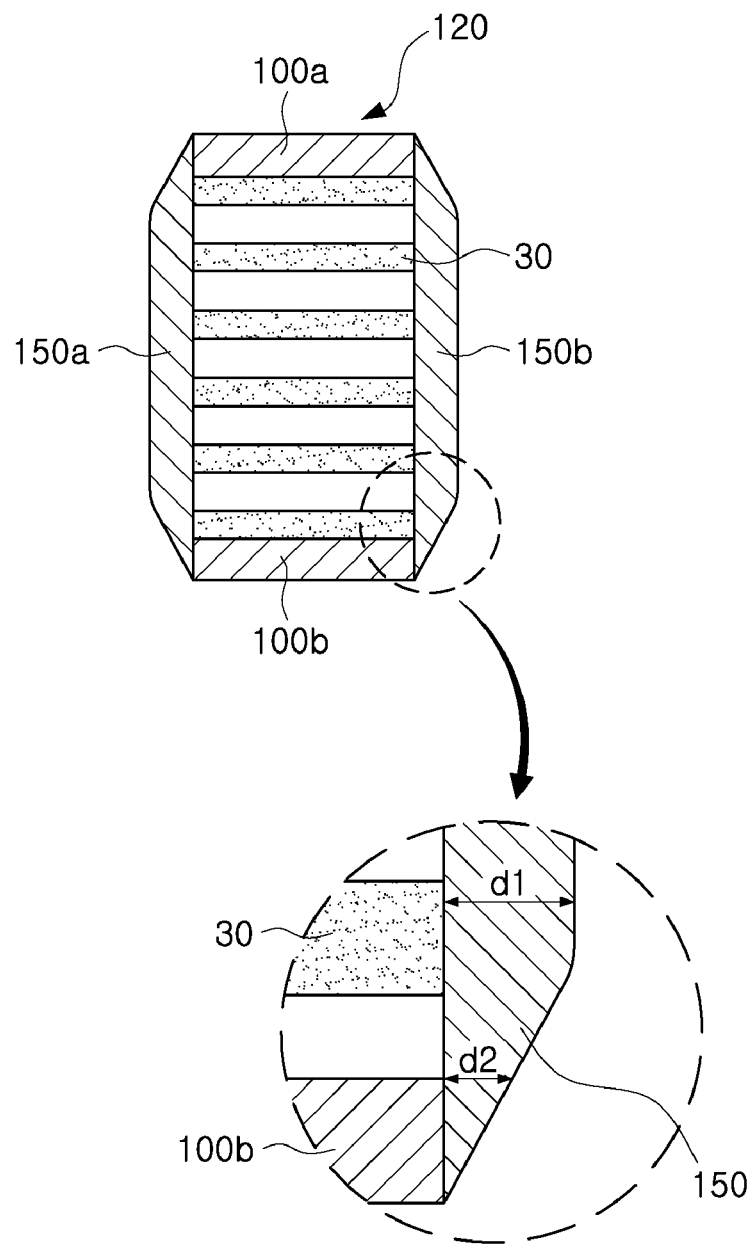
FIG. 5 is a cross-sectional view showing a multilayer main body formed with a first side portion and a second portion according to an exemplary embodiment of the present invention.
Figure 6:
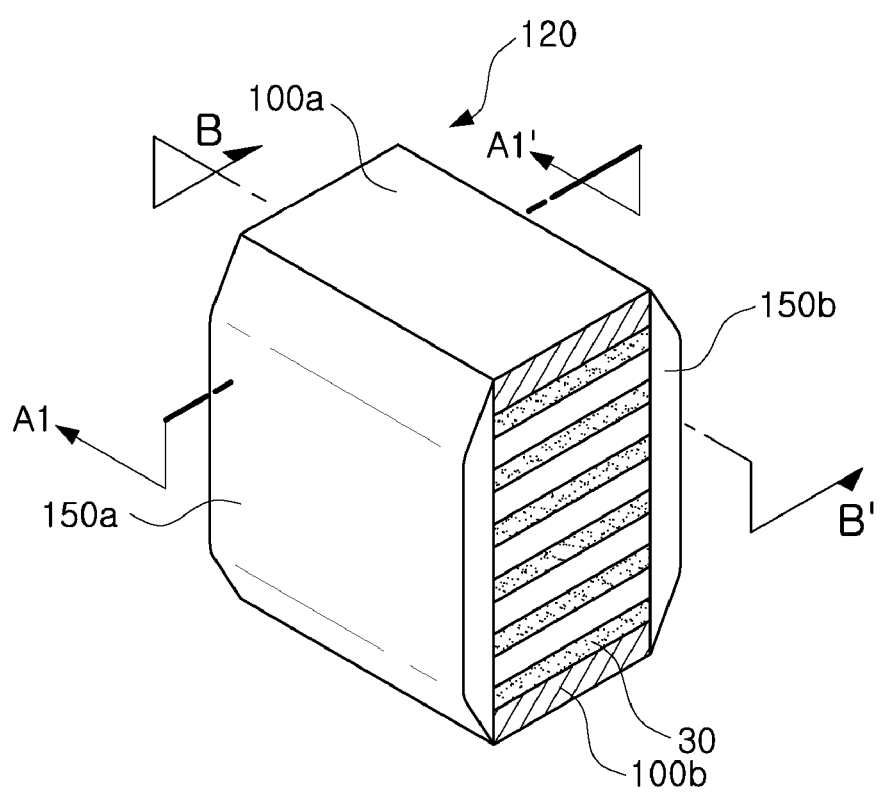
FIG. 6 is a perspective view showing a multilayer main body formed with a first side portion and a second portion according to an exemplary embodiment of the present invention.

FIG. 1 is a perspective view of a multilayer ceramic condenser according to an exemplary embodiment of the present invention, FIG. 2 is an exploded perspective view of a multilayer ceramic condenser according to an exemplary embodiment of the present invention, FIG. 3 is a perspective view showing a multilayer main body of a multilayer ceramic condenser according to an exemplary embodiment of the present invention, FIG. 4 is a cross-sectional view taken along line A-A' of the multilayer main body, FIG. 5 is a cross-sectional view showing a multilayer main body formed with a first side portion and a second portion according to an exemplary embodiment of the present invention, and FIG. 6 is a perspective view showing a multilayer main body formed with a first side portion and a second portion according to an exemplary embodiment of the present invention.

Referring to FIG. 1 showing a multilayer ceramic condenser according to an exemplary embodiment of the present invention, a multilayer ceramic condenser 1 includes a multilayer main body 20 in which a plurality of dielectric layers are stacked, a first outer electrode 10a, and a second outer electrode 10b.

The multilayer main body 20 is formed by stacking a plurality of dielectric layers and has a structure in which the plurality of dielectric layers are alternately stacked with the first inner electrode and the second inner electrode.

The multilayer main body 20 may be formed to include a first side, a second side, a third side, and a fourth side in sequence. The first side and the third side, which are formed to be opposite to each other, are each connected to the first outer electrode 10a and the second outer electrode 10b and the second side and the fourth side are disposed to be opposite to each other.

A first inner electrode and a second inner electrode are each formed to be drawn to the first side and the third side, such that they may be electrically connected to the first outer electrode 10a and the second outer electrode 10b.

The plurality of dielectric layers configuring the multilayer main body may be manufactured as a high-K ceramic green sheet.

The first outer electrode 10a and the second outer electrode 10b may be made of materials having excellent electric conductivity and may serve to electrically connect a first inner electrode pattern, a second inner electrode pattern, or other various patterns formed in the multilayer ceramic condenser to outer devices, but is not limited thereto. Therefore, the first outer electrode 10a and the second outer electrode 10b may be made of a material such as Ni, Ag, Pd, or the like.

Referring to FIG. 2 showing an exploded perspective view of a multilayer ceramic condenser according to an exemplary embodiment of the present invention, the multilayer main body 20 is configured to include a first cover layer 100a and a second cover layer 100b disposed on the top and bottom surfaces thereof, first dielectric sheets 201 and 208 printed with a first inner electrode pattern 30a, and second dielectric sheets 202 and 209 printed with second inner electrode pattern 30b.

The multilayer main body 20, in which the plurality of dielectric layers are stacked, includes the first cover layer 100a and the second cover layer 100b formed on the top and bottom portions thereof and the plurality of dielectric sheets 201, 202, 208, and 209 disposed between the first cover layer 100a and the second cover layer 100b. Here the plurality of dielectric layers are manufactured in the form of the ceramic green sheet and then, are subjected to a firing process and a stacking process.

The ceramic green sheet may be manufactured by applying a ceramic paste including ceramic powder, an organic binder including ethyl cellulose, polyvinyl butyral, or the like, and an organic solvent.

The ceramic powder is a high-K material. Without being thereto as the ceramic powder a barium titanate-based material, a lead complex Perovskite-based material, a strontium titanate-based material, or the like may be used, preferably, a barium titanate powder may be used.

The first inner electrode pattern 30a and the second inner electrode pattern 30b may be made of conductive metals having excellent electric conductivity. For example, the conductive metal may include at least one selected from the group consisting of Ni, Cu, Pd and an alloy thereof, but not limited thereto.

The multilayer main body 20 is configured to include the first cover layer 100a and the second cover layer 100b formed on the top and bottom portions thereof and the plurality of first dielectric layers 201 and 208 printed with the first inner electrode patterns, and the plurality of second dielectric layers 202 and 209 printed with the second inner electrode patterns. The first dielectric layers 201 and 208 and the second dielectric layers 202 and 209 are alternately stacked with each other, such that the first inner electrode patterns 30a may be formed to be drawn to the first side and the second inner electrode patterns 30b may be formed to be drawn to the third side.

FIG. 3 is a perspective view showing a multilayer main body formed by stacking the plurality of dielectric layers as shown in FIG. 2.

Referring to FIG. 3, the first cover layer 100a and the second cover layer 100b are formed on the top and bottom surfaces of a multilayer main body 120 and the first dielectric layer and the second dielectric layer are alternately stacked therebetween such that the first inner electrode patterns 30a may be formed to be drawn to the first side and the second inner electrode patterns 30b may be formed to be drawn to the third side.

In this case, direction A-A' is a direction of the second side and the fourth side and both the first inner electrode patterns 30a and the second inner electrode patterns 30b are exposed to the second side and the fourth side.

The first cover layer 100a and the second cover layer 100b are formed on the top and the lowermost portions of the dielectric layers printed with the plurality of inner electrode patterns to serve to protect the patterns formed therein from the outside.

Although the first inner electrode patterns 30a or the second inner electrode patterns 30b are drawn to the first side and the third side, respectively, the first side is provided with the first outer electrode 10a and the third side is provided with the second outer electrode 10b, such that the first inner electrode patterns 30a and the second inner electrode patterns 30b may be protected from being exposed to the outside, through the first outer electrode 110a and the second outer electrode 110b.

However, since the first inner electrode patterns 30a and the second inner electrode patterns 30b are formed to be exposed to the second side and the fourth side, there is a need to protect the inner electrode patterns formed therein by disposing separate side portions in the second side and the fourth side.

In order to form the side portions, the multilayer main body 120 may be dipped in slurry including a dielectric ceramic.

The slurry may include a ceramic powder, an organic binder, and an organic solvent. The ceramic powder may use a material having excellent heat resistance and durability and wide working tolerance when forming the side portions, as a high-K material.

The ceramic powder is not limited thereto, but a barium titanate-based material, a lead complex Perovskite-based material, a strontium titanate-based material, or the like, may be used, preferably, the barium titanate powder may be used.

The organic binder is to secure the dispersibility of the ceramic power in the slurry. Without being limited thereto, as the organic binder, ethyl cellulose, polyvinyl butyral, and a mixture thereof may be used.

As described above, when the multilayer main body 120 is dipped in the produced slurry, the slurry is applied to the surface of the multilayer main body 120, on which the multilayer main body 120 is contacted to the slurry, such that the side portions may be formed. Further, in order to form the multilayer main body 120 having the desired thickness, the desired amount of slurry may be applied to the multilayer main body 120 by repeating the dipping and the drying.

When the multilayer main body 120 is dipped in the slurry, the slurry should not be applied to the first side and the third side of the multilayer main body 120 since the first side and the third side of the multilayer main body 120 are provided with the outer electrodes. Therefore, the multilayer main body 120 may be dipped in the slurry by attaching a film to the first side and the third side so that the first side and the third side are not exposed to the outside. Without being limited thereto, the first side and the third side may be dipped in a non-exposed state before the first side and the third are cut off.

When the multilayer main body 120 is dipped, the first cover layer 100a, the second cover layer 100b, the second side, and the fourth side of the multilayer main body 120 are exposed to the outside, such that the slurry may be applied thereto.

When the slurry is applied to the first cover layer 100a and the second cover layer 100b, the thicknesses of the first cover layer 100a and the second cover layer 100b are excessively thick and the volume of the chip may be excessively large accordingly.

Referring to FIG. 4, according to an exemplary embodiment of the present invention, a first film 110a and a second film 110b may be attached to the first cover layer 100a and the second cover layer 100b, respectively.

According to the exemplary embodiment of the present invention, each of the first film 110a and the second film 100b may be an adhesive film.

The adhesive film is a detachable film, such that it may be easily attached to the first cover layer 100a and the second cover layer 100b and easily removed therefrom after being dipped in the slurry. When the film such as the adhesive film is attached to the cover layer, the slurry is not applied to the cover layer but is applied to the adhesive film. Thereafter, when the film is removed, the slurry applied thereto is removed together, such that it is possible to prevent the slurry from being applied to the cover layers.

According to an exemplary embodiment of the present invention, the first film and the second film may be an ultraviolet (UV) adhesive film. The UV adhesive film is a film that may be easily attached to the cover layers while maintaining the adhesion before irradiating ultraviolet rays thereto and may be easily removed therefrom by applying the slurry and then irradiating the ultraviolet rays thereto to remove the adhesion of the UV adhesive film.

According to an exemplary embodiment of the present invention, the first film 110a and the second film 110b may each be attached to the first cover layer 110a and the second cover layer 100b, such that the slurry may not attached on the first film 110a and the second film 110b when being dipped in the slurry.

Referring to FIG. 5, the slurry is attached to only the second side and the fourth side, thereby forming a first side portion 150a and a second side portion 150b.

Referring to FIGS. 5 and 6, the second side and the fourth side corresponding to direction A1-A1' of the multilayer main body 120 of the multilayer ceramic condenser may be provided with the first side portion 150a and the second side portion 150b.

The thicknesses of the first side portion 150a and the second side portion 150b may be controlled according to the number of dipping. Therefore, as the number of dipping is increased, the thicknesses of the first side portion 150a and the second side portion 150b may be thicker.

In the case of the multilayer ceramic condenser according to the exemplary embodiment of the present invention, the first side and the third side corresponding to direction B-B' may be provided with the first outer electrode and the second outer electrode and the second side and the fourth side corresponding to direction A1-A1' may be provided with the first side portion 150a and the second side portion 150b.

In particular, in the case of the multilayer main body 120, in order to protect the plurality of electrode patterns formed therein, the top and lowest portions of the plurality of dielectric layers may be provided with the first cover layer 100a and the second cover layer 100b and the second side and the fourth side of the multilayer main body 120 may be provided with the first side portion 150a and the second side portion 150b.

Therefore, the chip having the excellent durability and preventing the crack occurrence may be produced by securing the thickness of the side portion of the chip, in particular, the edge portion corresponding to the end of the side portion.

In particular, referring to FIG. 5, when the maximum thickness of the side portion of the multilayer main body 120 according to the present invention is referred to as d1 and the thickness of the edge portion, i.e., the portion contacting the corner portions of the multilayer main body 120 at the side portions is referred to as d2, the d1 and d2 may satisfy the following Equations 1 and 2.

$$10\ \mu m \leq d1 \leq 30 \mu m \qquad \text{[Equation 1]}$$

$$2\ \mu m \leq d2 \leq d1 \qquad \text{[Equation 2]}$$

According to the exemplary embodiment of the present invention, the maximum thickness of the side portion of the multilayer main body 120 may be set to be 10 μm or more in order to secure the strength and durability of the chip for protecting the patterns formed in the multilayer main body.

However, if the maximum thickness of the side portion exceeds 30 μm, a space capable of forming the inner electrode patterns is narrow, such that it is difficult to implement the high capacity. Therefore, the maximum thickness of the side portion may be 30 μm or less and in order to maximize the capacity, the maximum thickness thereof may be set to be 20 μm or less.

In addition, the thickness of the side portion, in particular, the thickness of the edge may be set to be 2 μm or more. If the thickness of the edge portion is below 2 μm, the radiating crack may occur when connecting to the outer electrode and it is difficult to secure moisture resistance from the outside. Therefore, the thickness of the edge portion may be set to be 2 μm or more.

In order to implement the high capacity, the thickness of the edge portion may be thinner than that of the side portion corresponding to d1.

According to an exemplary embodiment of the present invention, the thickness of the first cover layer and the second cover layer may be set to be 10 μm or less even though the first side portion and the second side portion are formed to have a thickness as above.

Since the first cover layer and the second cover layer are attached with the first film and the second film and the first film and the second film are removed after the process of forming the side portions, the thicknesses of the dielectric layers may be maintained with the cover layers being not affected by the application of slurry.

According to an exemplary embodiment of the present invention, when the thickness of the cover layers is set to be 10 μm or more, it is difficult to implement the high capacity, such that the thickness of the cover layers may be set to be 10 μm or less.

According to an exemplary embodiment of the present invention, the first side portion and the second side portion are formed at two surfaces of the chip, thereby securing the thickness corresponding to the margin of the chip and ensuring the durability and moisture resistance of the chip.

Further, according to an exemplary embodiment of the present invention, the thickness of the edge portion could be secured, thereby preventing the deformation of the chip, such as the radiating crack, or the like.

Further, according to an exemplary embodiment of the present invention, the cover layer having a thin thickness could be secured while the thicknesses of the side portion and the edge portion are ensured. Therefore the chip with the strong durability may be manufactured, while having the high capacity.

In the case of the multilayer ceramic condenser, according to an exemplary embodiment of the present invention, the side portions having the desired thickness could be simply formed on only the sides opposite to each other and accordingly, the super-capacity multi-layer ceramic condenser could be implemented, while improving the reliability of the chip.

As set forth above, according to the method for manufacturing a multilayer ceramic condenser according to the exemplary embodiments of the present invention, the side portions of the multilayer main body could be formed at a desired thickness, thereby securing the thickness of the edge portion. Further, the present invention can prevent the thickness of the cover portions from being excessively thick.

In addition, according to the exemplary embodiments of the present invention, slurry could be applied to only a desired surface by a simple method, thereby securing the thickness of the side portion, in particular, the edge portion. In particular, the amount of slurry and the number of dipping could be controlled, thereby forming the side portion having the desired thickness.

While the present invention has been shown and described in connection with the exemplary embodiments, it will be apparent to those skilled in the art that modification and variation can be made withough departing from the spirit and scope of the invention as defined by the appended claims.

What is claimed is:

1. A method for manufacturing a multilayer ceramic condenser, comprising:
preparing a multilayer main body including a first cover layer, a second cover layer, a plurality of first dielectric layers formed between the first cover layer and the second cover layer and printed with first inner electrode patterns and a plurality of second dielectric layers alternately stacked with the plurality of first dielectric layers and printed with second inner electrode patterns, and a first side, a second side, a third side, and a fourth side, wherein each of the second side and the fourth side intersects both the first and second inner electrode patterns, the first side intersects the first inner electrode pattern, and the third side intersects the second inner electrode pattern;

attaching a first film and a second film to the first cover layer and the second cover layer of the multilayer main body;

forming a first side portion and a second side portion on the second side and the fourth side, respectively, by dipping the multilayer main body attached with the first film and the second film in slurry, wherein the slurry includes a ceramic powder including at least one selected from a barium titanate-based material, a lead complex Perovskite-based material and a strontium titanate-based material; and removing the first film and the second film attached to the multilayer main body, wherein the slurry is a dielectric.

2. The method of claim 1, wherein the first film or the second film is an adhesive film.

3. The method of claim 1, wherein the first film or the second film is an ultraviolet (UV) adhesive film.

4. The method of claim 1, wherein a thickness of the first side portion and the second side portion is controlled by adjusting the number of dipping.

5. The method of claim 1, wherein the dipping of the multilayer main body is performed before the first side and the third side are cut off.

6. The method of claim 1, wherein a maximum thickness of the first side portion or the second portion is 10 μm to 30 μm.

7. The method of claim 1, wherein a maximum thickness of the first side portion or the second portion is 10 μm to 20 μm.

8. The method of claim 1, wherein a thickness of an edge portion contacting corners of the multilayer main body at the first side portion or the second side portion is 2 μm or more.

9. The method of claim 1, wherein a thickness of the first cover layer or the second cover layer is 10 μm or less.

10. The method of claim 1, further comprising foaming a first outer electrode and a second outer electrode on the first side and the third side, respectively.

* * * * *